(12) United States Patent
Kim

(10) Patent No.: US 8,770,544 B2
(45) Date of Patent: Jul. 8, 2014

(54) ELECTRIC WASTE GATE ACTUATOR FOR TURBOCHARGER

(75) Inventor: Jin Ra Kim, Gyeonggi-do (KR)

(73) Assignee: MANDO Corporation, Pyeongtaek-si, Gyeonggi-do (KR)

( * ) Notice: Subject to any disclaimer, the term of this patent is extended or adjusted under 35 U.S.C. 154(b) by 275 days.

(21) Appl. No.: 13/301,095

(22) Filed: Nov. 21, 2011

(65) Prior Publication Data

US 2012/0124993 A1 May 24, 2012

(30) Foreign Application Priority Data

Nov. 19, 2010 (KR) .................. 10-2010-0115767

(51) Int. Cl.
*F16K 31/02* (2006.01)

(52) U.S. Cl.
USPC .................................. 251/129.11; 251/250.5

(58) Field of Classification Search
USPC ............... 251/129.11, 129.12, 248, 250.5
See application file for complete search history.

(56) References Cited

U.S. PATENT DOCUMENTS

| | | | | |
|---|---|---|---|---|
| 5,161,508 A | * | 11/1992 | Zentgraf et al. | 123/339.25 |
| 6,135,415 A | * | 10/2000 | Kloda et al. | 251/129.11 |
| 6,683,429 B2 | * | 1/2004 | Pringle et al. | 318/466 |
| 7,055,795 B2 | * | 6/2006 | Lay | 251/129.03 |
| 7,946,555 B2 | * | 5/2011 | Ikeda | 251/129.11 |
| 2006/0237675 A1 | * | 10/2006 | Telep et al. | 251/129.11 |
| 2012/0138827 A1 | * | 6/2012 | Kim | 251/129.11 |

FOREIGN PATENT DOCUMENTS

| | | |
|---|---|---|
| JP | 2002-349641 | 12/2002 |
| JP | 2003-289648 | 10/2003 |
| JP | 2007-236067 | 9/2007 |
| WO | WO 2009/156268 | 12/2009 |

\* cited by examiner

*Primary Examiner* — John K Fristoe, Jr.
*Assistant Examiner* — Ian Paquette
(74) *Attorney, Agent, or Firm* — McDermott Will & Emery LLP

(57) ABSTRACT

Provided is an electric waste gate actuator for a turbocharger, in which the inside of a housing is divided into an upper portion and a lower portion to thereby prevent foreign particles generated in a decelerator from being introduced into a driving motor. The electric waste gate actuator for a turbocharger includes: a housing having an installation space inside; a decelerator installed in an upper portion of the installation space; a lever coupled to an upper end of the decelerator and installed outside the installation space; a driving motor installed in a lower portion of the installation space; a blocking plate dividing the installation space into the upper portion, where the decelerator is installed, and the lower portion, where the driving motor is installed, and preventing foreign particles generated in the decelerator from being introduced into the lower portion of the installation space; and a sensor unit installed under the blocking plate to measure a rotation angle of the decelerator.

8 Claims, 2 Drawing Sheets

ELECTRIC WASTE GATE ACTUATOR FOR TURBOCHARGER

CROSS-REFERENCE(S) TO RELATED APPLICATION

This application claims priority of Korean Patent Application No. 10-2010-0115767, filed on Nov. 19, 2010, in the Korean Intellectual Property Office, which is hereby incorporated by reference in its entirety.

BACKGROUND OF THE INVENTION

1. Field of the Invention

The present invention relates to an electric waste gate actuator for a turbocharger, and more particularly, to an electric waste gate actuator for a turbocharger, in which the inside of a housing is divided into an upper portion and a lower portion to thereby prevent foreign particles generated in a decelerator from being introduced into a driving motor.

2. Description of the Related Art

Generally, power generated by an internal combustion engine is dependent on a mass of air and an amount of fuel that may be supplied to the internal combustion engine. In order to increase the power of the internal combustion engine, it is necessary to supply a larger amount of combustion air and fuel. The increase in the power of the internal combustion engine may be achieved by increasing a cubic capacity or rotational speed of an intake engine. However, the increase in the cubic capacity leads to an expensive internal combustion engine having a relatively heavy weight and a large size. In particular, the increase in the rotational speed accompanies serious problems and disadvantages in a relatively large internal combustion engine.

Supercharging has been often adopted as a technical solution to increasing the power of the internal combustion engine. Supercharging refers to precompressing combustion air using an exhaust gas turbocharger or a compressor mechanically driven by an engine. The exhaust gas turbocharger basically includes a turbine and a compressor connected to a common shaft and rotating at a constant rotational speed. The turbine converts uselessly exhausted energy into rotational energy through exhaust gas. The turbine drives the compressor. The compressor sucks new air and supplies precompressed air to individual cylinders of an engine. An increased amount of fuel is supplied to a relatively large amount of air in the cylinder. As a result, the internal combustion engine outputs higher power. Therefore, a combustion process is additionally influenced preferably, and the internal combustion engine has a higher total efficiency level. In addition, a torque profile of the internal combustion engine, which is supercharged by the turbocharger, may be formed very preferably.

Since a series induction motor from a vehicle manufacturer uses an exhaust gas turbocharger, it may be considerably optimized without a structural interference with an internal combustion engine over a wide range. Generally, the supercharged internal combustion engine has a relatively low specific fuel consumption and a lower pollutant emission rate. Furthermore, since the exhaust gas turbocharger itself acts as an additional silencer, the turbo engine is silent at the same power level as compared to a typical intake engine.

In an internal combustion engine having a wide rotational speed range (for example, an internal combustion engine for a car), a high charging pressure is required at a low rotational speed of an engine. To this end, a charging pressure control valve, called a waste gate valve, has been applied to a turbocharger. By selecting a relevant turbine casing, a high charging pressure is formed at a low rotational speed of an engine. The waste gate valve limits a charging pressure to a predetermined level according to the increase in the rotational speed of an engine.

In the conventional electric waste gate actuator having the above-described functions, gears are disposed on a motor, a sensor, and an electronic control unit (ECU), and therefore, foreign particles generated in grease used in the gears and generated by abrasion of the gears are introduced into a motor terminal, an ECU, and a sensor, causing the degradation of performance. Furthermore, if a sensor directly measuring a rotation of an output shaft is used due to spatial limitation, there is difficulty in a structure for supporting both ends of a gear.

SUMMARY OF THE INVENTION

An aspect of the present invention is directed to an electric waste gate actuator for a turbocharger, in which both ends of a decelerator are fixed between a housing and a cover, and a motor and an ECU are separated from the decelerator, thereby preventing foreign particles from being introduced into the motor and the ECU.

According to an embodiment of the present invention, an electric waste gate actuator for a turbocharger includes: a housing having an installation space inside; a decelerator installed in an upper portion of the installation space; a lever coupled to an upper end of the decelerator and installed outside the installation space; a driving motor installed in a lower portion of the installation space; a blocking plate dividing the installation space into the upper portion, where the decelerator is installed, and the lower portion, where the driving motor is installed, and preventing foreign particles generated in the decelerator from being introduced into the lower portion of the installation space; and a sensor unit installed under the blocking plate to measure a rotation angle of the decelerator.

The decelerator may include a main rotational shaft and a plurality of gears coupled to the main rotational shaft, and the main rotational shaft passes through the blocking plate, such that a lower end of the main rotational shaft is disposed under a top surface of the blocking plate.

The sensor unit may include: a magnet installed at a lower end of the main rotational shaft, such that the magnet is disposed under the top surface of the blocking plate; and a sensor installed in the lower portion of the installation space under the magnet and measuring the rotation angle of the decelerator by sensing a variation in a flux of the magnet.

An upper end of an uppermost rotational shaft among rotational shafts coupled to the plurality of gears may pass through an upper end of the housing and may be coupled to the lever at the outside of the housing.

The motor may include a vertically protruding motor shaft at an upper end, and the motor shaft may pass through the blocking plate and may be coupled to the decelerator in the upper portion of the installation space.

The blocking plate may include: a motor terminal installed on a top surface of the driving motor and having a first through-hole for fixing the driving motor; and a plate coupled to a top surface of the motor terminal and having a second through-hole coupled to the first through-hole.

The electric waste gate actuator may further include an electronic control unit (ECU) installed on the housing at the outside of the installation space.

An external space recessed directly under the decelerator in a lateral direction of the motor may be provided at the outside of the housing, and the electronic control unit may be installed in the external space.

The housing may include: a body having an opened upper end; and a cover closing the opened upper end of the body.

REFERENCE NUMERALS

Figure 1:
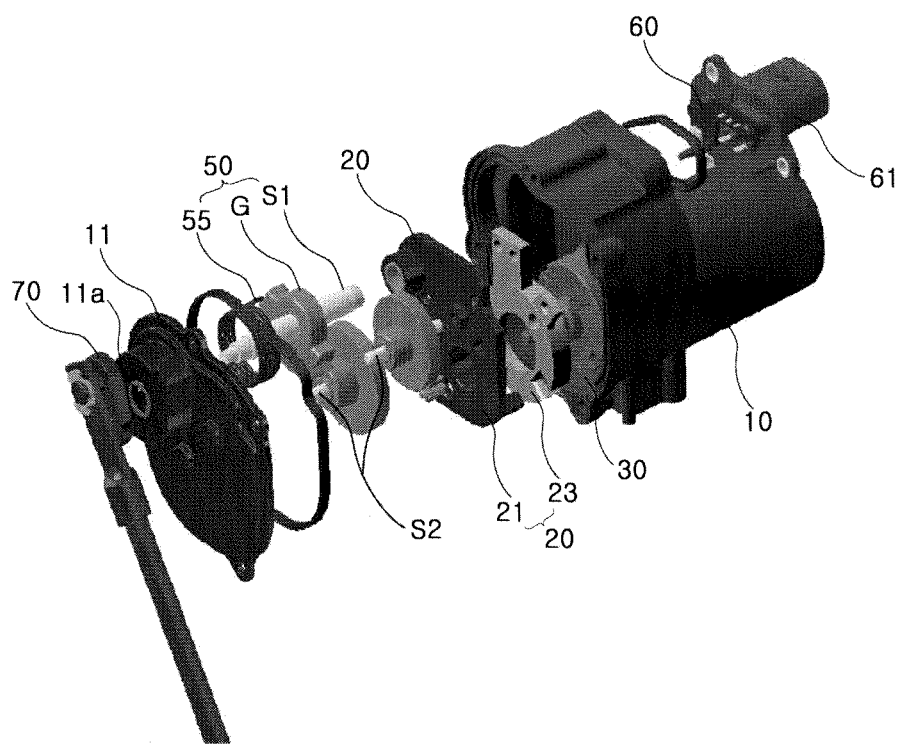
FIG. 1 is an exploded perspective view showing an electric waste gate actuator for a turbocharger according to an embodiment of the present invention.

10: housing
20: blocking plate
30: driving motor
40: sensor unit
50: decelerator
60: ECU

DETAILED DESCRIPTION OF EXEMPLARY EMBODIMENTS

Exemplary embodiments of the present invention will be described below in detail with reference to the accompanying drawings. However, the present invention should not be construed as being limited to the exemplary embodiments set forth herein. Throughout the disclosure, like reference numerals refer to like parts throughout the drawings and embodiments of the present invention.

Figure 2:
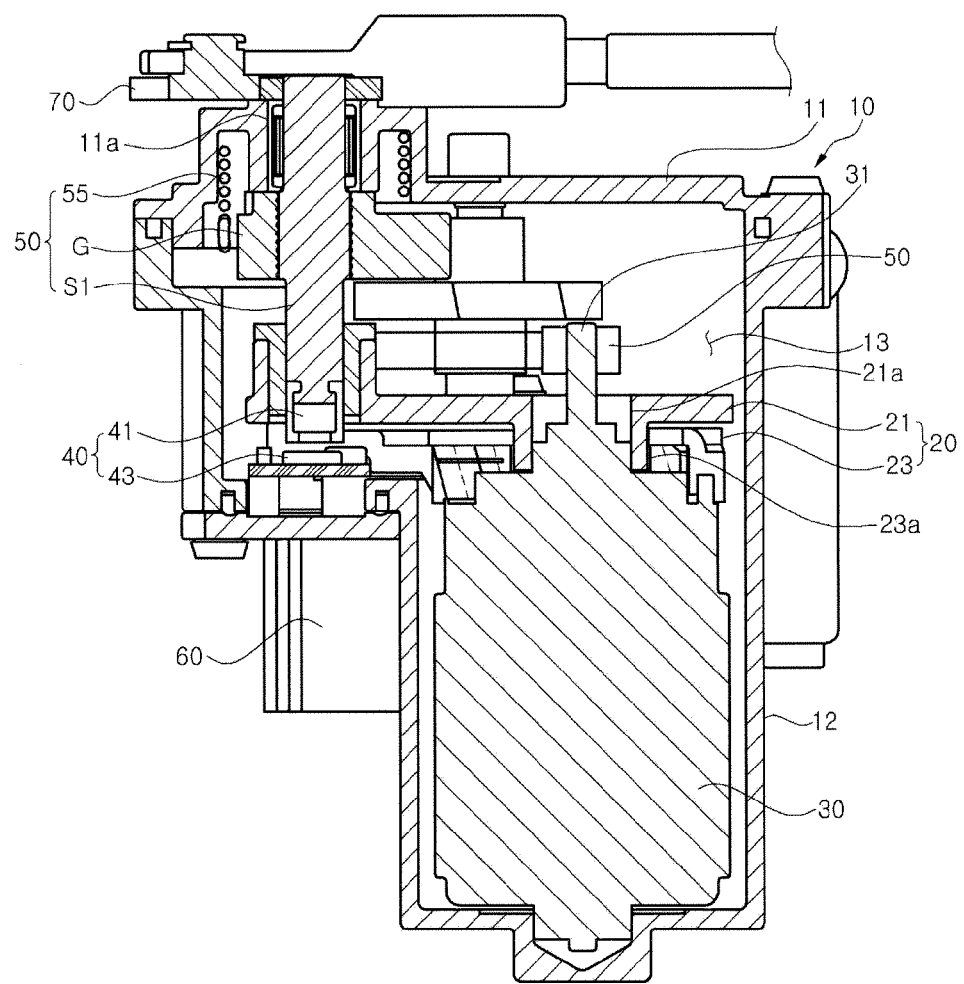
FIG. 2 is a partial cut-away cross-sectional view schematically showing an electric waste gate actuator for a turbocharger according to an embodiment of the present invention.

FIG. 1 is an exploded perspective view showing an electric waste gate actuator for a turbocharger according to an embodiment of the present invention, and FIG. 2 is a partial cut-away cross-sectional view schematically showing an electric waste gate actuator for a turbocharger according to an embodiment of the present invention.

For reference, it should be noted that FIG. 2 is a partial cut-away view of an electric waste gate actuator for a turbocharger according to an embodiment of the present invention, and thus, a part of a decelerator is not shown herein.

In addition, it should be noted that the following description will be made with reference to FIG. 2, focusing on installation directions of elements.

Referring to FIGS. 1 and 2, an electric waste gate actuator for a turbocharger according to an embodiment of the present invention includes a housing 10 having an installation space inside. A decelerator 50 is installed in an upper portion of the installation space 13. A lever 70 is installed in the exterior such that it is coupled to an upper end of the decelerator 50. A driving motor 30 is installed in a lower portion of the installation space 13. A blocking plate 20 divides the installation space into the upper portion and the lower portion. The ECU 60 is installed at the outer periphery of the housing 10.

The housing 10 includes a cylindrical body 12 and a cover 11. The body 12 has an opened upper end and forms the installation space 13. The cover closes the opened upper end of the body 12. The cover 11 has a plate shape, and an insertion hole 11a is formed at one side of the cover 11.

The driving motor 30 is installed in the lower portion of the installation space 13 and generates a torque.

The decelerator 50 includes a plurality of gears G, a main rotational shaft S1 and sub rotational shafts S2 forming shafts of the gears G, and a return spring 55. A motor shaft 31 is coupled to the upper portion of the installation space 13, such that it is organically coupled to the gear G located at a lower portion among the gears G of the decelerator 50. The decelerator 50 coupled to the driving motor 30 generates a relatively higher torque than that generated by the driving motor 30. Meanwhile, the upper end of the main rotational shaft S1 passes through the insertion hole 11a and is exposed to the exterior, and the exposed upper end of the main rotational shaft S1 is coupled to the lever 70. Therefore, the decelerator 50 may transmit a torque to the turbocharger.

The blocking plate 20 includes a motor terminal 23 and a plate 21. The motor terminal 23 has a plate shape in which a first through-hole 23a is drilled. The motor terminal 23 is closely installed at the upper end of the driving motor 30, such that the motor terminal 23 fixes the position of the driving motor 30 and the plate 21 is closely installed on the top surface of the motor terminal 23. The plate 21 has a plate shape in which a second through-hole 21a is drilled. The plate 21 is closely installed on the top surface of the motor terminal 23. The first through-hole 23a and the second through-hole 21a are vertically connected to each other. Therefore, the motor shaft 31 protruding vertically from the upper end of the driving motor 30 passes through the first and second through-holes 23a and 21a and is coupled to the upper portion of the installation space 13. The blocking plate 20 divides the installation space 13 into the upper portion and the lower portion.

In addition, the lower end of the main rotational shaft S1 of the decelerator 50 passes through a portion of the blocking plate 20 and is coupled to the lower portion of the installation space 13. A magnet 41 is installed at the lower end of the main rotational shaft S1, and a sensor 43 is installed in the lower portion of the installation space 13 under the magnet 41. The magnet 41 and the sensor 43 constitute a sensor unit 40.

The sensor 43 is a contactless type and is installed under the magnet 41. The magnet 41 is rotated with the rotation of the main rotational shaft Si and measures a rotation angle by sensing a variation of a flux.

The ECU 60 is disposed at the outer periphery of the housing 10. In particular, the ECU 60 is disposed at one side of the driving motor 30 under the sensor 43.

Since the blocking plate 20 divides the installation space 13 into the upper portion and the lower portion as described above, the decelerator 50 is separated from the driving motor 30, the sensor unit 40, and the ECU 60. Therefore, it is possible to prevent malfunction or performance degradation, which may be caused when foreign particles generated by the abrasion of the gears G and grease used in the gears G are introduced into the driving motor 30, the sensor unit 40, and the ECU 60. Moreover, since the sensor 43 has a contactless structure, the spatial limitation of the installation space 13 is structurally reduced. Therefore, it is easy to support both ends of the decelerator 50. That is, the sub rotational shafts S2 and the main rotational shaft S1 forming both ends of the decelerator 50 may be supported to the blocking plate 20.

Meanwhile, since the ECU 60 is separately installed at the outer periphery of the housing 10, water does not directly infiltrate into the ECU 60. Also, brush powder generated in the driving motor 30 does not adhere to grease used in the gears.

In the electric waste gate actuator for a turbocharger according to the embodiment of the present invention, both ends of the decelerator are fixed between the housing and the cover, and the motor and the ECU are separated from the decelerator. Therefore, the introduction of foreign particles into the motor and the ECU may be prevented and the lifetime of the actuator may be extended.

Furthermore, water does not directly infiltrate into the ECU.

Moreover, brush powder generated in the motor does not adhere to grease used in the gears.

While the embodiments of the present invention has been described with reference to the specific embodiments, it will be apparent to those skilled in the art that various changes and modifications may be made without departing from the spirit and scope of the invention as defined in the following claims.

What is claimed is:

1. An electric waste gate actuator for a turbocharger, comprising:
   a housing having an installation space inside;
   a decelerator installed in an upper portion of the installation space;
   a lever coupled to an upper end of the decelerator and installed outside the installation space;
   a driving motor installed in a lower portion of the installation space;
   a blocking plate dividing the installation space into the upper portion, where the decelerator is installed, and the lower portion, where the driving motor is installed, and preventing foreign particles generated in the decelerator from being introduced into the lower portion of the installation space; and
   a sensor unit installed under the blocking plate to measure a rotation angle of the decelerator,
   wherein the blocking plate comprises:
      a motor terminal installed on a top surface of the driving motor and having a first through-hole for fixing the driving motor; and
      a plate coupled to a top surface of the motor terminal and having a second through-hole coupled to the first through-hole.

2. The electric waste gate actuator according to claim 1, wherein the motor comprises a vertically protruding motor shaft at an upper end, and the motor shaft passes through the blocking plate and is coupled to the decelerator in the upper portion of the installation space.

3. The electric waste gate actuator according to claim 1, wherein the housing comprises:
   a body having an opened upper end; and
   a cover closing the opened upper end of the body.

4. The electric waste gate actuator according to claim 1, wherein the decelerator comprises a main rotational shaft and a plurality of gears coupled to the main rotational shaft, and the main rotational shaft passes through the blocking plate, such that a lower end of the main rotational shaft is disposed under a top surface of the blocking plate.

5. The electric waste gate actuator according to claim 4, wherein the sensor unit comprises:
   a magnet installed at a lower end of the main rotational shaft, such that the magnet is disposed under the top surface of the blocking plate; and
   a sensor installed in the lower portion of the installation space under the magnet and measuring the rotation angle of the decelerator by sensing a variation in a flux of the magnet.

6. The electric waste gate actuator according to claim 4, wherein an upper end of an uppermost rotational shaft among rotational shafts coupled to the plurality of gears passes through an upper end of the housing and is coupled to the lever at the outside of the housing.

7. The electric waste gate actuator according to claim 1, further comprising an electronic control unit (ECU) installed on the housing at the outside of the installation space.

8. The electric waste gate actuator according to claim 7, wherein an external space recessed directly under the decelerator in a lateral direction of the motor is provided at the outside of the housing, and the electronic control unit is installed in the external space.

* * * * *